March 2, 1954  W. E. HAMMOND ET AL  2,670,934
ADJUSTABLE AXIAL SEAL FOR REGENERATIVE HEAT EXCHANGER
Filed Oct. 12, 1950
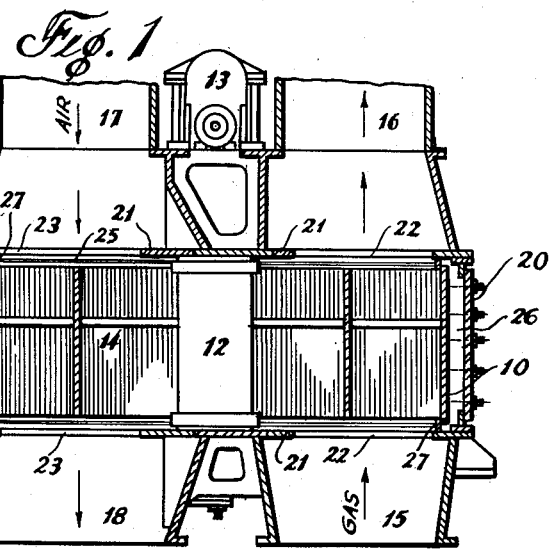
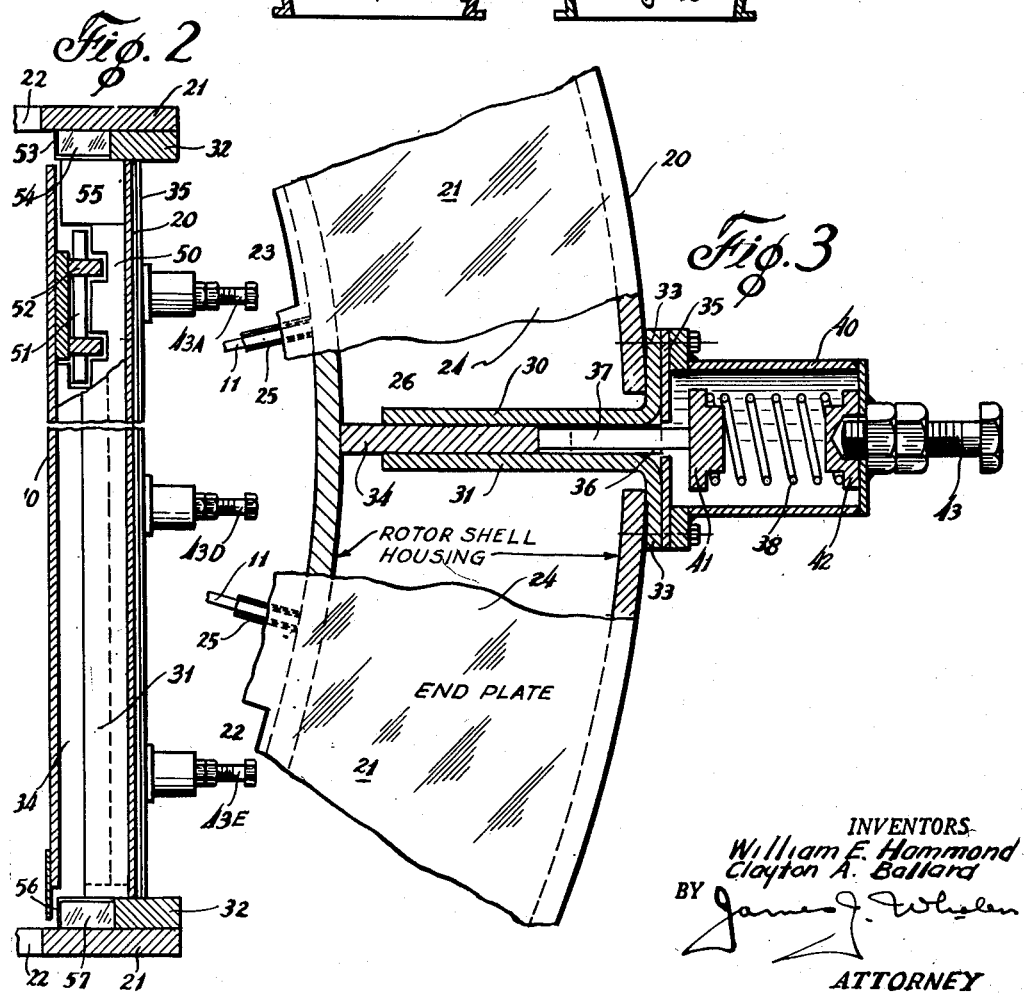
INVENTORS
William E. Hammond
Clayton A. Ballard
BY
ATTORNEY

UNITED STATES PATENT OFFICE 2,670,934

ADJUSTABLE AXIAL SEAL FOR REGENERATIVE HEAT EXCHANGER

William E. Hammond, Wellsville, and Clayton A. Ballard, Belmont, N. Y., assignors to The Air Preheater Corporation, New York, N. Y.

Application October 12, 1950, Serial No. 189,757

4 Claims. (Cl. 257—6)

The present invention relates to improved seals for use between the rotor and its enclosing housing in a rotary regenerative air preheater or similar apparatus.

In a rotary regenerative heater of the Ljungstrom type a cylindrical rotor has compartments carrying heat transfer material which as the rotor turns is first exposed to heating gases and then disposed in the air passage to impart the absorbed heat to the air. The rotor is enclosed in a housing having end plates formed with circumferentially spaced openings to provide for the flow of gas and air. To prevent the mingling of the two fluids the partitions that form the rotor compartments are provided with radial seals which wipe against the imperforate portions of the end plates between the openings provided for gas and air flow, or vice versa. In order to preclude bypassing of gas and air around the rotor through the clearance space between the sides of the rotor and the housing without passing over the heat transfer material, it is also customary to provide the rotor with circumferential seals that bear against the end plates or other stationary parts of the housing.

The present invention contemplates the provision of the usual radial seals while utilizing a circumferential seal only at the cold end of the rotor and adding a pair of axial seals to preclude mixture of gas and air by crossflow in the space around the side of the rotor. The invention will be best understood upon consideration of the following detailed description of an illustrative embodiment thereof when read in conjunction with the accompanying drawings in which:

Figure 1 is a sectional elevational view in diagrammatic form of a rotary regenerative air preheater embodying the present invention.

Figure 2 is a broken away view on an enlarged scale showing the relationship between the rotor, the housing and one of the axial seals.

Figure 3 is a sectional view on an enlarged scale illustrating the mounting of one of the axial seals in cooperative relation between the housing and the rotor together with one of the adjusting means therefor.

In the drawings the numeral 10 designates the cylindrical shell of a rotor divided into sector shaped compartments by radial partitions connecting it with the rotor post 12 which is driven by a motor and reduction gearing 13 to turn the rotor slowly about its axis. The rotor compartments contain regenerative heat transfer material in the form of closely spaced metallic plates 14 which first absorb heat from hot gases entering the preheater through a duct 15 from a boiler or other source to be discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through duct 18.

A housing 20 enclosing the rotor 10 is provided at either end opposite the latter with end or sector plates 21 which are apertured at 22 and 23 in circumferentially spaced locations to admit and discharge streams of gas and air flowing through the rotor. In order that the streams of gas and air may not commingle, the end plates 21 have imperforate portions 24 between the gas and air openings at least equal to but usually greater in circumferential extent than one rotor compartment for engagement by the radial seals indicated at 25 to isolate or block off at least one compartment when positioned between the gas and air passages. In order that the streams of gas and air may not by-pass the heat transfer surface 14 by flowing axially in the annular clearance space 26 between the rotor shell 10 and the housing 20 it is customary to provide circumferential seals indicated diagrammatically at 27 on the shell 10 which wipe against confronting parts of the end plates 21 or allied parts so as to seal off the space 26.

According to the present invention a circumferential seal 27 is provided only at the cold end of the rotor and axial sealing devices are provided extending between the rotor and housing to prevent leakage of air to the gas side around the rotor 10 in the space 26, these being in addition to the usual radial seals 25 that preclude leakage across the ends of the rotor from the air to the gas passage. The omission of the circumferential seal heretofore conventionally provided at the "hot" end of the preheater permits the entering hot gas and the heated air to flow into the space 26 around the rotor so as to maintain parts of the rotor shell 10 and opposite parts of the housing 20 at substantially the same temperature so as to minimize relative distortion due to non-uniform expansion and contraction. As is illustrated in Figures 2 and 3 seal guiding plates 30, 31 are attached to the housing 20 and extend in spaced parallel relation in a direction axially of the rotor shell 10 in the space 26 between the latter and the inner wall of the housing. The guide plates 30, 31 extend between the upper and lower rotor housing flanges 32 to which the end plates 21 are fixed and are provided with lateral flanges 33 by means of which they may be attached to the wall of the housing 20. The guide plates 30, 31 project inwardly from the inner wall of housing 20 into the space 24 between the housing 20 and rotor shell 10 to a point somewhat short of the latter in locations beneath the imperforate portions of the sector plates 21 so that the seals 34 mounted between them engage the rotor shell 10 to completely seal off the air passage from the gas passage and preclude leakage around the rotor in the space 24. In the groove between each of the two pairs of guide plates 30, 31 a sealing plate 34 is mounted which has a height coextensive with that of the distance between the flange plates 32 on the housing 20. The two sealing members 34 mounted at opposite sides of the rotor, but not necessarily at diametral locations, are each pressed into contact with the outer surface of the rotor shell 10 by several plungers 37 each biased by a spring 38 carried in a housing 40 mounted on the outside of the rotor housing 20. The space between the guide plates 30, 31 is closed by the cover strip 35 which is provided with a series of slots 36 to accommodate a number of plungers positioned at different locations axially of the rotor so that independent adjustments may be effected of these seal strips 34 at different positions axially of the rotor to accommodate any bulging or bowing of the rotor or of the enclosing housing. These individual adjustments may be effected by means of the screws 43 associated with the several springs 38.

At the top of the rotor a baffle angle 53 is provided extending circumferentially beneath the sector plate 21 and baffle end pieces 54 are mounted in positions circumferentially spaced in accordance with the locations of the sealing strips 34. There is also provided a baffle plate 55, this serves to reduce radial leakage of air. At the lower end of the rotor a similar baffle angle 56 is provided and end plates 57. Here also there is provided a sealing circumferential strip. Also at the hot end of the preheater the end edge of the rotor shell is provided with the sealing strip 58 which limits the amount of fluid that may be bypassed.

Thus, the axial seals 34 extend from the housing flange at the hot end of the preheater to the similar flange at the cold end. The sealing shoes 34 mounted between the retainers 30, 31 on the housing are pressed against the rotor shell 10 by the series of independently adjustable spring actuated flanges 34. This effects a complete seal between the air and gas passages and precludes flow therebetween in a direction around the side of the rotor in the space 26 between the latter and the housing. In the way of the sector plates on both ends of the header the baffles 53, 54, 55, 56, 57 prevent radial leakage of air.

What we claim is:

1. A regenerative apparatus including a rotor comprising a cylindrical shell carrying heat transfer material separated by an annular space from a housing that surrounds the rotor and which is provided opposite the circular ends of the latter with axially spaced upper and lower end plates including imperforate portions located between circumferentially spaced apertures formed in said plates for the flow of heating gases and air to and through the rotor; axial seals mounted in said annular space between the rotor shell and housing in locations confronting and intermediate imperforate portions of the upper and lower end plates between the flow apertures in said end plates comprising; a pair of sealing members extending parallel to the axis of the rotor from the lower to the upper end plate and projecting from the inner wall of the housing into said annular space between the latter and the rotor in spaced relation circumferentially of the rotor; and a plurality of individually adjustable biasing means associated with each sealing member at points spaced axially of the rotor for biasing the said member into sealing contact with the rotor shell.

2. A regenerative apparatus including a rotor comprising a cylindrical shell carrying heat transfer material separated by an annular space from a housing that surrounds the rotor and which is provided opposite the circular ends of the latter with axially spaced upper and lower end plates including imperforate portions located between circumferentially spaced apertures formed in said plates for the flow of heating gases and air to and through the rotor; axial seals mounted in said annular space between the rotor shell and housing in locations confronting and intermediate imperforate portions of said end plates between the flow apertures in the upper and lower end plates each comprising: a pair of guide plates extending parallel to the axis of the rotor from the lower to the upper end plate and projecting from the inner wall of the housing into said annular space between the latter and the rotor in spaced relation circumferentially of the rotor to form an open channel facing the rotor shell; a seal strip member seated in said channel and projecting therefrom toward the side of the rotor shell; a plurality of individually adjustable biasing springs associated with said sealing member at points spaced axially of the rotor for biasing the said member into sealing contact with the rotor; and individual means for adjusting the biasing force applied by said springs to said axial sealing strips.

3. A regenerative apparatus including a rotor comprising a cylindrical shell carrying heat transfer material separated by an annular space from a housing that surrounds the rotor and which is provided opposite the circular ends of the latter with axially spaced upper and lower end plates including imperforate portions located between circumferentially spaced apertures formed in said plates for the flow of heating gases and air to and through the rotor; circumferential sealing means between the rotor and housing located at one end of the rotor; axial seals mounted in said annular space between the rotor shell and housing in locations confronting and intermediate imperforate portions of the upper and lower end plates between the flow apertures in said end plates comprising: a pair of sealing members extending parallel to the axis of the rotor from the lower to the upper end plate and projecting from the inner wall of the housing into said annular space between the latter and the rotor in spaced relation circumferentially of the rotor; a plurality of individually adjustable biasing means associated with each sealing member at points spaced axially of the rotor for biasing the said member into sealing contact with the rotor; and individual means for adjusting the biasing force applied to said axial sealing strips.

4. A regenerative apparatus including a rotor comprising a cylindrical shell carrying heat transfer material separated by an annular space from a housing that surrounds the rotor and which is provided opposite the circular ends of the latter with axially spaced upper and lower end plates including imperforate portions located between circumferentially spaced apertures formed in said plates for the flow of heating gases and air to and through the rotor; circumferential sealing means between the rotor and housing at only the gas inlet and air outlet end thereof; axial seals mounted in said annular space between the rotor shell and housing in locations confronting and intermediate imperforate portions of said end plates between the flow apertures in the upper and lower end plates each comprising: a pair of guide plates extending parallel to the axis of the rotor from the lower to the upper end plate and projecting from the inner wall of the housing into said annular space between the latter and the rotor and disposed in spaced relation circumferentially of the rotor to form an open slot facing the rotor shell; a seal strip member seated in said slot and projecting therefrom toward the side of the rotor shell; a plurality of individually adjustable biasing means associated with said sealing member at points spaced axially of the rotor for biasing the said member into sealing contact with the rotor; and individual means for adjusting the biasing force applied to said axial sealing strips.

WILLIAM E. HAMMOND.
CLAYTON A. BALLARD.

References Cited in the file of this patent

UNITED STATES PATENTS

| Number | Name | Date |
|---|---|---|
| 2,287,777 | Boestad | June 30, 1942 |
| 2,337,907 | Lundstrom | Dec. 28, 1943 |
| 2,347,829 | Karlsson et al. | May 2, 1944 |
| 2,480,248 | Karlsson et al. | Aug. 30, 1949 |

FOREIGN PATENTS

| Number | Country | Date |
|---|---|---|
| 970,696 | France | June 21, 1950 |